(12) United States Patent
Zhang et al.

(10) Patent No.: US 7,749,661 B2
(45) Date of Patent: Jul. 6, 2010

(54) HIGH PERFORMANCE, COMPACT AND LOW PRESSURE DROP SPIRAL-WOUND FUEL CELL HUMIDIFIER DESIGN

(75) Inventors: Yan Zhang, Victor, NY (US); Glenn W. Skala, Churchville, NY (US); Annette Brenner, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 655 days.

(21) Appl. No.: 11/669,929

(22) Filed: Jan. 31, 2007

(65) Prior Publication Data

US 2008/0182149 A1 Jul. 31, 2008

(51) Int. Cl.
*H01M 8/04* (2006.01)
*B01D 5/00* (2006.01)

(52) U.S. Cl. ........................ 429/413; 429/512; 261/101; 261/102

(58) Field of Classification Search .................... 429/24, 429/26, 34; 261/100, 101, 102, 103, 104, 261/105
See application file for complete search history.

(56) References Cited

U.S. PATENT DOCUMENTS

| | | | |
|---|---|---|---|
| 3,278,175 A * | 10/1966 | Hirtz | 261/103 X |
| 4,774,032 A * | 9/1988 | Coates et al. | 261/104 |
| 6,284,399 B1 | 9/2001 | Oko | |
| 6,783,878 B2 | 8/2004 | Voss et al. | |
| 6,864,005 B2 | 3/2005 | Mossman | |

2008/0001313 A1   1/2008   Zhang et al.

OTHER PUBLICATIONS

Schwinge, J., et al., "Spiral Wound Modules and Spacers Review and Analysis", Journal of Membrane Science 242 (20040, pp. 129-153, (2004).
Geraldes, Vitor, et al., "Flow Management in Nanofiltration Spiral Wound Modules with Ladder-Type Spacers", Journal of Membrane Science 203 (2002) pp. 87-102.
Qi, Runhong et al., "Optimal Design of Spiral-Wound Membrane Networks for Gas Separations", Journal of Membrane Science 148 (1998), pp. 71-89.
Yeh, H.M., et al., "Analysis of Dialysis Coupled with Ultrafiltration in Cross-Flow Membrane Modules", Journal of Membrane Science 134 (1997), pp. 151-162.
Levy, Peter F., et al., "The Effect of Channel Height and Channel Spacers on Flux and Energy Requirements in Crossflow Filtration", Journal of Membrane Science 91 (1994), pp.135-153.

* cited by examiner

*Primary Examiner*—Stephen J. Kalafut
(74) *Attorney, Agent, or Firm*—John A. Miller; Miller IP Group, PLC

(57) ABSTRACT

A WVT unit for a fuel cell system that employs a spiral-wound design to reduce its size and increase its performance. The WVT unit includes a center tube having a plurality of openings through which the cathode exhaust gas flows. The WVT unit also includes a cylindrical portion wound around the center tube that includes a plurality of enclosures and a plurality of dry spacer layers separating the enclosures. Each enclosure includes a pair of membranes separated by a wet spacer layer. The dry cathode inlet air flows down the dry spacer layers between the enclosures and the cathode exhaust gas flows into the plurality of enclosures through the openings in the center tube along the wet spacer layers to allow the membranes to absorb humidification that is transferred to the cathode inlet air.

21 Claims, 1 Drawing Sheet

HIGH PERFORMANCE, COMPACT AND LOW PRESSURE DROP SPIRAL-WOUND FUEL CELL HUMIDIFIER DESIGN

BACKGROUND OF THE INVENTION

1. Field of the Invention

This invention relates generally to a water vapor transfer (WVT) unit for humidifying a cathode inlet airflow to a fuel cell stack in a fuel cell system and, more particularly, to a WVT unit for humidifying a cathode inlet airflow to a fuel cell stack in a fuel cell system, where the WVT unit employs a spiral-wound design for reducing packaging space.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack.

As mentioned above, water is generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. In one known design, the WVT unit includes flow channels defined by stamped metal plates and a membrane positioned therebetween. Water in the cathode exhaust gas flowing down the flow channels at one side of the membrane is absorbed by the membrane and transferred to the cathode air stream flowing down the flow channels at the other side of the membrane.

The WVT units used for a fuel cell system of the type discussed herein typically need to be compact, have a low pressure drop and have a high performance. Through fundamental model studies and testing, certain parameters for such a WVT unit have been identified. These parameters include use of a membrane material having a very high transfer performance, i.e., equivalent or better than Nafion 111, and a distance between the bulk gas and the surface of the membrane less than 0.5 mm, and preferably less than 0.33 mm, to reduce the wet gas phase mass transfer resistance resulting in a very small repeating distance enabling laminar flow and a low pressure drop.

One known design for fuel cell applications is a planar type WVT unit having repeating cells. In this design, the WVT unit includes two types of plates, i.e., wet plates and dry plates, that are alternately stacked with divider plates therebetween. However, the thickness of the divider plates in the repeating cell design contributes significantly to the thicknesses of the cells resulting in a larger and heavier assembly. Thus, it may be desirable to improve the divider plate design to reduce the size of the WVT unit.

SUMMARY OF THE INVENTION

In accordance with the teachings of the present invention, a WVT unit for a fuel cell system is disclosed that employs a spiral-wound design to reduce its size and increase its performance. The WVT unit includes a center tube having a plurality of openings through which the cathode exhaust gas flows. The WVT unit also includes a cylindrical portion wound around the center tube that includes a plurality of enclosures and a plurality of dry spacer layers separating the enclosures. Each enclosure includes a pair of membranes separated by a wet spacer layer. The dry cathode inlet air flows down the dry spacer layers between the enclosures and the cathode exhaust gas flows into the plurality of enclosures through the openings in the center tube along the wet spacer layers to allow the membranes to absorb humidification that is transferred to the cathode inlet air.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a WVT unit employing a spiral-wound design is merely exemplary in nature, and is in no way intended to limit the invention or its applications or uses. For example, the WVT unit of the invention has particular application for humidifying the cathode inlet airflow to a fuel cell stack. However, as will be appreciated by those skilled in the art, the WVT unit of the present invention may have other applications.

Figure 1:
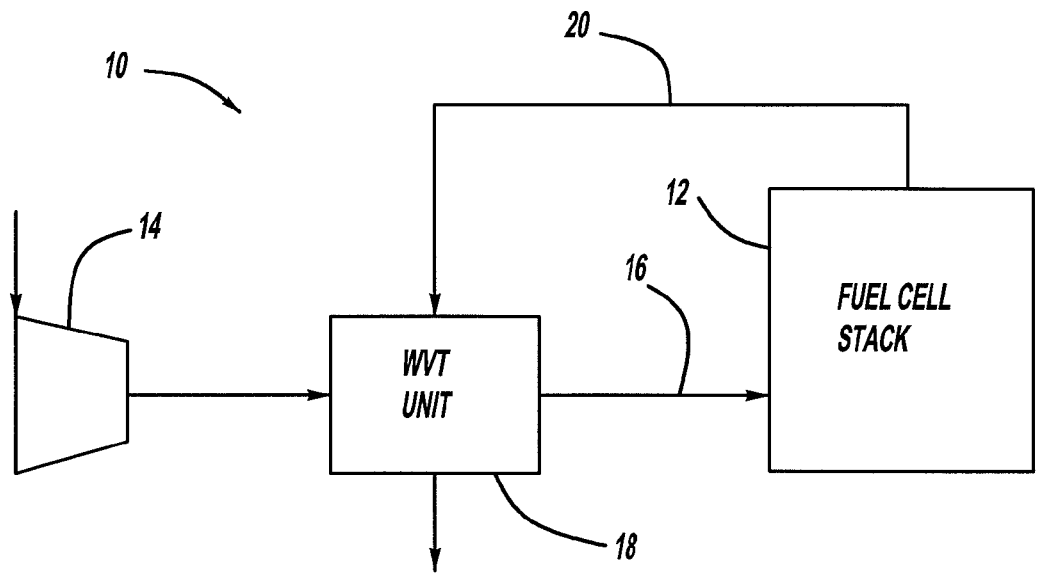
FIG. 1 is a block diagram of a fuel cell system including a WVT unit for humidifying a cathode inlet airflow to a fuel cell stack.

FIG. 1 is a schematic block diagram of a fuel cell system 10 including a fuel cell stack 12. A compressor 14 provides a flow of air to the cathode side of the stack 12 on a cathode input line 16. The flow of air from the compressor 14 is sent through a WVT unit 18 to be humidified. A cathode exhaust gas is output from the stack 12 on a cathode output line 20. The cathode exhaust gas includes a considerable amount of liquid water and water vapor as a by-product of the electrochemical process in the fuel cell stack 12. As is well understood in the art, the cathode exhaust gas can be sent to the WVT unit 18 to provide the humidification for the cathode inlet air on the line 16.

The present invention proposes a spiral-wound WVT unit for a fuel cell application. Spiral-wound water vapor transfer units are known in the art for various applications, such as for filters, gas separators, etc. The present invention proposes a variation of these designs that is applicable for a fuel cell system. The spiral-wound WVT unit of the invention is compact and has a relatively low pressure drop. Further, the spiral-wound WVT unit of the invention employs high performance membrane materials, such as Nafion 111, and spacer materials having a thickness on the order of 0.6 mm that may incorporate parallel flow channels about 0.3 mm deep and 0.5 mm wide. The spiral-wound WVT unit also includes a diffusion media or membrane support, that may or may not be hydrophilic, to provide support to the membrane while allowing access for diffusion under the ribs of the spacer material. The spiral-wound WVT unit of the invention can employ folds and/or pleats to reduce possible leak paths while also allowing for faster and lower cost manufacturing.

Figure 2:
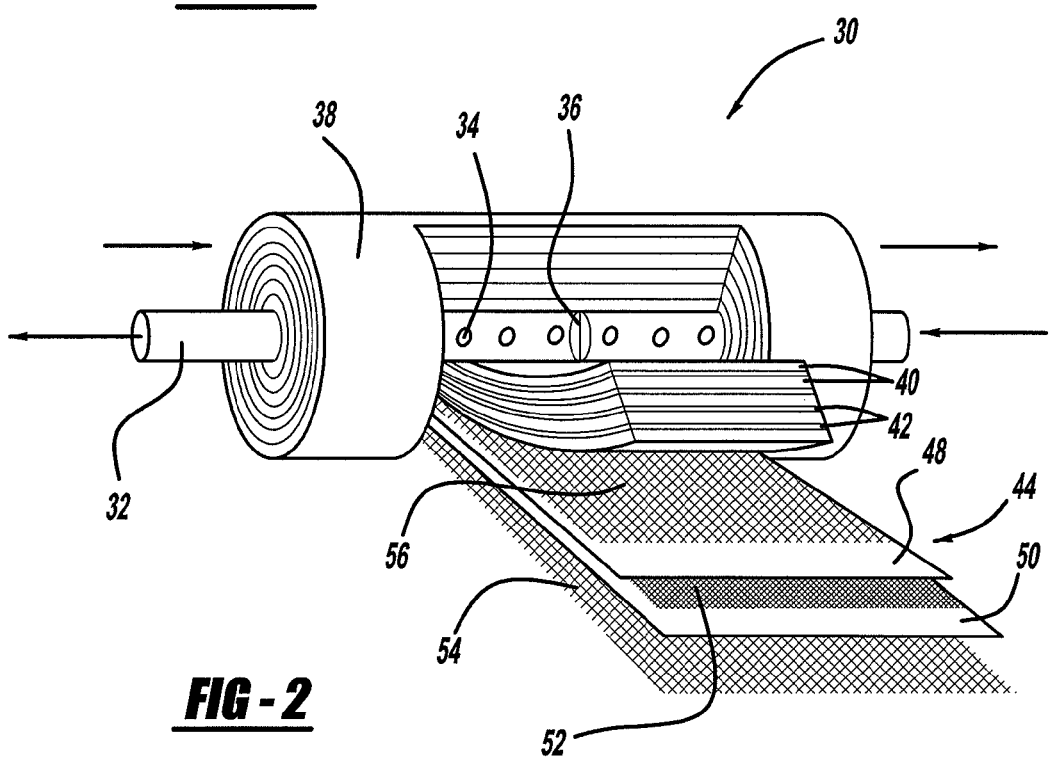
FIG. 2 is an exploded perspective view of a spiral-wound WVT unit for use in the fuel cell system shown in FIG. 1, according to an embodiment of the present invention.

FIG. 2 is an exploded perspective view of a spiral-wound WVT unit 30, according to an embodiment of the present invention. The WVT unit 30 includes a center tube 32 made of a suitable material, such as an inexpensive plastic. In one non-limiting embodiment, the center tube 32 has a diameter of about 38 mm for the application discussed herein. The wet cathode exhaust gas from the fuel cell stack 12 on the output line 20 is input at the right end of the tube 32 and is output at the left end of the tube 32. The tube 32 includes a series of holes or perforations 34 and a valve 36. The perforations 34 can have any suitable size or shape for the purposes described herein, such as slits.

A plurality of membrane envelopes 40 are wrapped around the tube 32 and are separated by dry spacer layers 42 to define a membrane bundle 38. The dry cathode inlet air is introduced into the dry spacer layers 42 at a left side of the bundle 38 and exits as a humidified cathode airflow at the right end of the bundle 38 in a counter-propagation flow to the cathode exhaust gas flowing down the tube 32. Although the cathode inlet air and the cathode exhaust flow are shown in a counter-propagating flow direction in this embodiment, other flow designs can be provided, such as cross-flow or co-flow designs. When the valve 36 is open, the cathode exhaust gas is allowed to directly flow through the tube 32 without entering the envelopes 40. When the valve 36 is closed, the cathode exhaust gas exits the tube 32 through the perforations 34 and into the envelopes 40 to provide the cathode inlet air humidification. The row of perforations 34 shown in FIG. 2 is for a single envelope 40 where the envelope 40 is sealed to the tube 32 so that the cathode exhaust gas can enter the envelope 40. A separate row of perforations is provided for each envelope 40 in the bundle 38.

One of the envelopes 40 is shown extended and separated from the bundle 38 as envelope 44. The envelope 44 includes a pair of membrane layers 48 and 50 separated by a wet spacer layer 52. In one non-limiting embodiment, the wet spacer layer 52 has a thickness of about 0.6 mm. Dry spacer layers 54 and 56 are positioned on opposite sides of the membrane layers 48 and 50. Although not specifically shown, the envelope 44 is sealed on three sides and to the tube 32 so that a row of the perforations 34 are in fluid communication with the inside of the envelope 44. When the valve 36 is closed, the cathode exhaust gas enters the envelope 44 through the perforations 34, and flows through the envelope 44 along the wet space layer 52 between the membrane layers 48 and 50 towards an end of the envelope 44 opposite to the end that is sealed to the tube 32. When the cathode exhaust gas reaches the end of the envelope 44, it changes direction and flows back down the envelope 44, and re-enters the tube 32 through the perforations 34. As the cathode exhaust gas flows through the envelope 44 through the weave provided by the wet spacer layer 52, the water in the cathode exhaust gas is absorbed by the membrane layers 48 and 50.

The cathode inlet air flows across and through the dry spacer layers 54 and 56 as it propagates through the bundle 38. In one embodiment, the dry spacer layers 54 and 56 are a suitable thermoplastic weave having a suitable thickness for the purposes described herein. The membrane layers 48 and 50 will absorb water and water vapor from the wet spacer layer 52, and transfer the humidity to the dry air flowing through the dry spacer layers 54 and 56. In an alternate embodiment, the dry spacer layers 54 and 56 are a rib-type material defining suitable flow channels. The membrane layers 48 and 50 can be hydrophilic so that they pass water, but do not pass gas, and can be any suitable non-porous water transfer membrane that meets the performance requirements for this application. Other hydrophilic polymers can also be used.

As mentioned above, the pressure drop that is provided by the WVT unit 30 is an important design consideration. In one non-limiting embodiment, in order to meet the desired pressure drop, the bundle 38 includes more than eighty of the envelopes 40. In one non-limiting embodiment, the bundle 38 is about 6 inches in diameter and about 12 inches long. The equivalent diameter of the open flow area is about 2.5 inches on the wet side and about 2 inches on the dry side, which ensures a low pressure drop across the unit 30. The WVT unit 30 is estimated to have a core volume of about six liters, and contain about 7 square meters of membrane material. In one design, the flow path of the envelopes 40 is selected so that full flow pressure drop provides all of the fuel cell system back pressure because the wet side flow is the cathode exhaust from the fuel cell stack 12. Opening the valve 36 could provide cathode humidity control through a variable wet side flow while simultaneously reducing the fuel cell cathode pressure. Further, by designing the dry flow path of the cathode inlet air to be of a minimal pressure drop, pumping losses can be reduced between the compressor 14 and the inlet to the cathode of the fuel cell stack 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack receiving a cathode inlet airflow and outputting a cathode exhaust gas flow;
   a compressor for providing the cathode airflow to the fuel cell stack; and
   a spiral-wound water vapor transfer unit receiving the cathode airflow from the compressor and a source of humidification, said water vapor transfer unit including a cylindrical portion having a plurality of enclosures that receive the humidification to humidify the cathode airflow.

2. The system according to claim 1 wherein the plurality of enclosures include opposing membranes that seal a wet spacer layer therebetween, where the humidification flows through the wet spacer layer.

3. The system according to claim 2 wherein the cylindrical portion includes a plurality of dry spacer layers that separate the enclosures, and wherein the humidity from the humidification source flowing through the wet spacer layers is transferred to the cathode airflow flowing through the dry spacers by the membranes.

4. The system according to claim 1 wherein the water vapor transfer unit further includes a center tube around which the plurality of enclosures are wound, said center tube including a plurality of perforations that allow the humidification to enter the plurality of enclosures.

5. The system according to claim 4 further comprising a valve positioned with the center tube, said valve being opened to allow the humidification to flow directly through the center tube and being closed to allow the humidification to flow into the plurality of enclosures through the plurality of perforations.

6. The system according to claim 4 wherein in the center tube has a diameter of about 38 mm.

7. The system according to claim 1 wherein the cathode exhaust gas is the source of humidification.

8. The system according to claim 7 wherein the cathode inlet airflow and the cathode exhaust gas flow flows through the water evaporation transfer unit in a counter-propagating direction.

9. The system according to claim 1 wherein the cylindrical portion is about 12 inches long and has a diameter of about 6 inches.

10. The system according to claim 2 wherein the membranes are hydrophilic membranes.

11. The system according to claim 1 wherein the water vapor transfer unit includes eighty or more enclosures.

12. The system according to claim 1 wherein the plurality of enclosures are formed by folded or pleated layers.

13. A fuel cell system comprising:
   a fuel cell stack receiving a cathode inlet airflow and outputting a cathode exhaust gas flow;
   a compressor for providing the cathode airflow to the fuel cell stack; and
   a spiral-wound water vapor transfer unit receiving the cathode airflow from the compressor and the cathode exhaust gas flow where the cathode exhaust gas flow provides humidity for humidifying the cathode inlet airflow, said water vapor transfer unit including a center tube through which the cathode exhaust gas flows, said center tube including a plurality of openings, said water vapor transfer unit further including a cylindrical portion wound around the center tube and including a plurality of enclosures and a plurality of dry spacer layers separating the enclosures, each enclosure including a pair of membranes separated by a wet spacer layer, wherein the cathode inlet air flows into an end of the cylindrical portion between the plurality of enclosures down the dry spacer layers and the cathode exhaust gas flows into the plurality of enclosures through the openings in the center tube along the wet spacer layers to allow the membranes to absorb humidification that is transferred to the cathode inlet.

14. The system according to claim 13 further comprising a valve positioned within the center tube, said valve being opened to allow the cathode exhaust gas to flow directly through the center tube and being closed to allow the cathode exhaust gas to flow into the plurality of enclosures through the plurality of perforations.

15. The system according to claim 13 wherein in the center tube has a diameter of about 38 mm.

16. The system according to claim 13 wherein the cathode inlet airflow and the cathode exhaust gas flow flows through the water evaporation transfer unit in a counter-propagating direction.

17. The system according to claim 13 wherein the cylindrical portion is about 12 inches long and has a diameter of about 6 inches.

18. The system according to claim 13 wherein the membranes are hydrophilic membranes.

19. A water vapor transfer unit comprising:
   a center tube having a first end and a second end, said center tube further including a plurality of perforations, said center tube receiving a wet flow at the first end that flows down the center tube and out of the second end;
   a cylindrical portion wound around the center tube and including a plurality of enclosures and a plurality of dry spacer layers separating the enclosures, each enclosure including a pair of membranes separated by a wet spacer layer, wherein a dry gas flows into an end of the cylindrical portion and flows down the cylindrical portion through the dry spacer layers between the enclosures, and wherein the wet gas flows into the plurality of enclosures through the perforations in the center tube along the wet spacer layers to allow the membranes to absorb humidification that is transferred to the dry flow; and
   a valve positioned within the center tube, said valve being opened to allow the wet flow to flow directly through the center tube and being closed to allow the wet flow to flow into the plurality of enclosures through the plurality of perforations.

20. The unit according to claim 19 wherein the dry flow and the wet flow through the water evaporation transfer unit in a counter-propagating direction.

21. The unit according to claim 19 wherein the membranes are hydrophilic membranes.

\* \* \* \* \*